US005542360A

United States Patent [19]
Fleming

[11] Patent Number: 5,542,360
[45] Date of Patent: * Aug. 6, 1996

[54] PILOT'S FLIGHT DESK

[76] Inventor: James Fleming, 140 Sherry La., Kalispell, Mont. 59901

[*] Notice: The portion of the term of this patent subsequent to Sep. 29, 2018, has been disclaimed.

[21] Appl. No.: 913,769

[22] Filed: Jun. 12, 1992

Related U.S. Application Data

[63] Continuation of Ser. No. 250,561, Sep. 29, 1988, abandoned.

[51] Int. Cl.⁶ .................................................. A47B 23/04
[52] U.S. Cl. ............................... 108/44; 108/23; 108/26; 248/278.1; 248/460
[58] Field of Search ................................. 108/23, 25, 26, 108/44, 45, 46, 90; 248/284.1, 447, 447.1, 447.2, 460, 311.2, 231.41, 231.61, 500, 441.1, 442.2, 278.1; 269/140, 145, 303

[56] References Cited

U.S. PATENT DOCUMENTS

| | | | |
|---|---|---|---|
| 598,689 | 2/1898 | Wilson | 248/442.2 X |
| 1,221,369 | 4/1917 | Osborn | 248/442.2 |
| 2,461,256 | 2/1949 | Black | 248/231.6 |
| 2,657,107 | 10/1953 | Bisaga et al. | 108/45 |
| 3,023,063 | 2/1962 | Hansen | 108/44 |
| 3,391,960 | 7/1968 | Megargle et al. | 108/44 X |
| 3,592,144 | 7/1971 | Futrell | 108/44 |
| 3,784,142 | 1/1974 | O'Brien | 108/26 |
| 3,994,465 | 11/1976 | Rudnitzky | 248/311.2 |
| 4,053,133 | 10/1977 | Kauffman | 108/45 |
| 4,312,507 | 1/1982 | Smith et al. | 108/23 |
| 4,359,004 | 11/1982 | Chappell | 108/44 |
| 4,481,846 | 11/1984 | Goodell | 83/438 |
| 4,558,618 | 12/1985 | Bachmann et al. | 269/303 |
| 4,582,285 | 4/1986 | Bello | 248/278 X |
| 4,586,440 | 5/1986 | Avella | 108/23 |
| 4,672,898 | 6/1987 | Davidson | 108/44 |
| 4,741,504 | 5/1988 | Monroe | 248/311.6 |
| 4,751,620 | 6/1988 | Wright et al. | 108/23 |
| 4,754,945 | 7/1988 | Diamond | 248/460 |
| 4,787,614 | 11/1988 | Givens | 269/304 |
| 4,852,499 | 8/1989 | Ozols | 108/25 X |
| 4,878,685 | 11/1989 | Bahm | 108/90 X |

FOREIGN PATENT DOCUMENTS 30918  1/1966  Germany ........................... 248/311.2

Primary Examiner—Brian K. Green
Attorney, Agent, or Firm—Foster & Foster

[57] ABSTRACT

A pilot's flight desk for use in aircraft as disclosed. The flight desk provides a planar desk surface supported above the aircraft floor by an upright support attached leg to a base plate which is clamped to the aircraft seat rails. The desk surface swivels and pivots with respect to the upright support and the upright support is pivotally attached to the base plate, thereby allowing for the compact folding of the pilot flight desk. A cup holder and swivel mounted pen light attached to the desk surface is also disclosed.

9 Claims, 4 Drawing Sheets

PILOT'S FLIGHT DESK

RELATED APPLICATION

This is a continuation of U.S. patent application Ser. No. 07/250,561, filed on Sep. 29, 1988, now abandoned.

BACKGROUND OF THE INVENTION

1. Field of the invention

This invention relates to a pilot's flight desk and in particular to a desk adapted for connection to the floor of an aircraft.

2. Discussion of the Technical Problems

In modern general aviation aircraft, pilot workload is steadily increasing due to changes in airspace and flight regulations. During periods of intense activity in the cockpit such as when executing instrument approaches or when copying clearances and navigating with the precision that is required in today's flight environment and in order to insure that the pilot is able to organize the cockpit area, an additional writing surface and a place to hold charts is needed.

In order to provide for a writing surface and chart holder, many pilots have resorted to knee boards which are generally of a clip board having a band or strap which fastens about the thigh of the user to secure the knee board to the user's knee. Additionally, lap boards have been developed which provide even a larger writing surface than knee boards. Unfortunately, knee boards and lap boards while useful are often cumbersome and can interfere with the proper movement of the aircraft flight controls as well as block the vision of the pilot so that it becomes difficult to see engine gauges and other instruments. A further drawback of knee boards and lap boards is that they require the pilot to shift his vision almost directly down in order to see the charts or the written material. Such a shifting of vision from the windshield and instrument panel to one's lap or knee can become distracting and fatiguing.

On the other hand, it would be useful to have a writing surface and a chart holder which would not require that it be attached to the user. The user then would be free to move his arms or legs, would not have charts and other papers sliding from side to side, and yet would still have a writing surface and chart holder that is in a comfortable writing position not requiring extreme head or eye movements to utilize. Such a device could properly be termed a pilot's flight desk and should provide a writing surface out of the way of the aircraft flight controls, off to the side of the vision of the flight instruments and engine gauges, and yet should provide a safe and secure holding device for charts as well as a place to write in a comfortable position. Such a pilot's flight desk should also provide a convenient place for the holding of coffee cups, soda cans, and the like as well as to provide for lighted nighttime operation.

Such a device should be uncomplicated in design, easily installed and removed, adapted to connection to most modern general aviation aircraft, lightweight, not subject to damage by proper use, and simple to manufacture. The instant invention is directed to all these needs as well as to others as explained in the following summary.

SUMMARY OF THE INVENTION

It is an object of the invention to provide a pilot's flight desk.

It is a further object to provide a pilot's flight desk adapted for connection to the floor of an aircraft.

It is a still further object of the invention to provide a pilot's flight desk attached to the floor of an aircraft wherein the pilot's flight desk provides a clip for holding charts and approach plates, as well as providing a writing surface, a light for night operation, and a can or cup holder. The writing surface is provided next to the pilot's seat and slightly offset so as not to :interfere with the operation of the aircraft. These and other objects are attained according to the instant invention by providing a pilot's flight desk having a transverse base adapted for removable connection to the pilot's or passenger's seat rails in the aircraft. The transverse base is further provided with an upstanding pivotal hinge and an angled upright support pivotally connected to a planar writing surface having a clip. A pivotally connected cup and can holder is attached to the planar writing surface as is a battery operated light source. The battery operated light is pivotally attached to the writing surface so that the light may be focused upon the planar surface. The pivoting connection between the angled upright support and the writing surface also swivels so that the writing surface as well as the upright support can be folded along with the lower base support plate so that the entire pilot's writing desk may be placed within a briefcase, suitcase, carrying case or the like.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
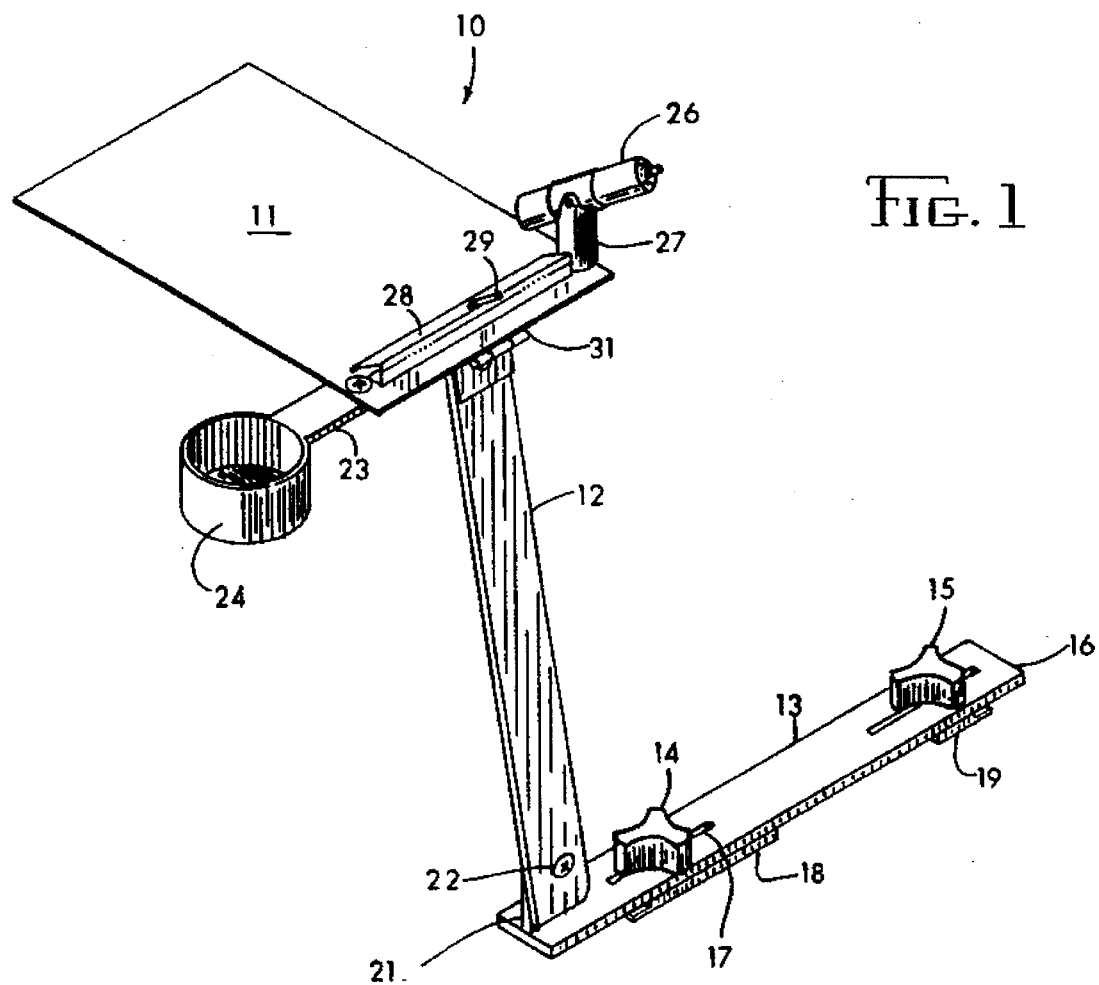
FIG. 1 is a perspective view of the pilot's flight desk in accordance with the present invention.

The pilot's flight desk of the instant invention is depicted generally in FIG. 1. As can be seen by reference to FIG. 1, the invention 10 provides a writing surface 11 which is elevated and supported by upright support 12 and affixed to the floor of an aircraft by transverse base plate 13. Additionally, seat rail attachment plates 18 and 19 are provided. Plates 18 and 19 are removably affixed to base plate 13 by use of screw knobs 14 and 15 and pass through transverse base plate slots 16 and 17 to provide a clamp which can be used to affix base plate 13 to the seat rails of an aircraft. Transverse base plate 13 is further provided with an upstanding support tab 21 to which pivot screw 22 is inserted to attach upright support leg 12. Writing surface 11 is then pivotally attached to the upper end of upright support leg 12 by the use of hinge 31 so that when transverse base plate 13 is attached to the aircraft seat rails, the writing desk 10 is in the proper position with planar writing surface 11 alongside the pilot in a comfortable writing position.

Figure 2:
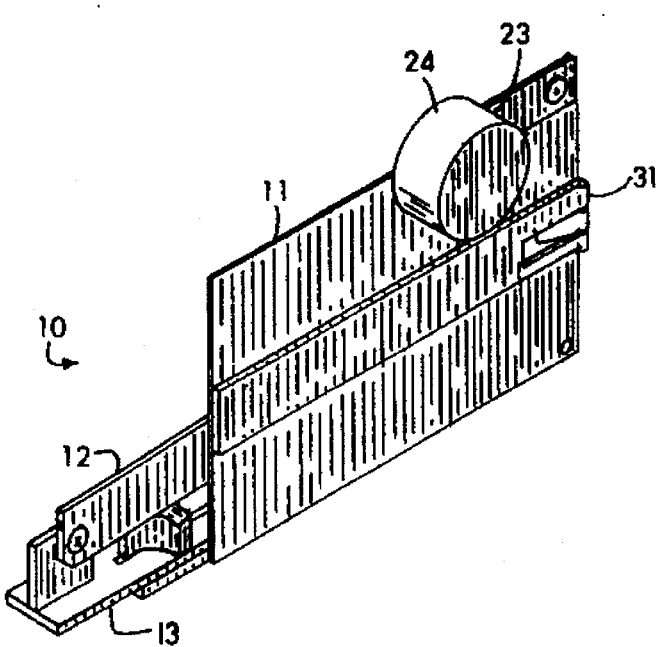
FIG. 2 is a perspective view of the pilot's flight desk in folded position showing the various components in folded relationship.

With reference to FIG. 2, it can be seen that elongate upright support leg 12 can be folded alongside base plate 13 and writing surface 11 can be folded at hinge 31 to substantially reduce the space taken up by the pilot desk 10. When folded, pilot desk 10 can be easily transported or placed within a flight case, briefcase, carrying bag, or the like. It should also be noted that pilot's desk 10, when in the folded position as depicted in FIG. 2, can be easily stored within the aircraft baggage compartment, under, or next to the aircraft seats.

With continued reference to FIG. 1, it can be seen that a conventional cup or can holder 24 having an extension arm 23 is pivotally attached to writing surface 11. In a similar manner a conventional battery operated light 26 is attached to writing surface 11 by use of swivel 27 so as to provide a light source upon the writing surface 11. In order to ensure that charts, approach plates, and the like are securely held in position upon writing surface 11, spring clip 28 is provided with thumb handle 29 to open spring clip 28 for the insertion of writing materials, charts, approach plates, and the like.

Figure 3:
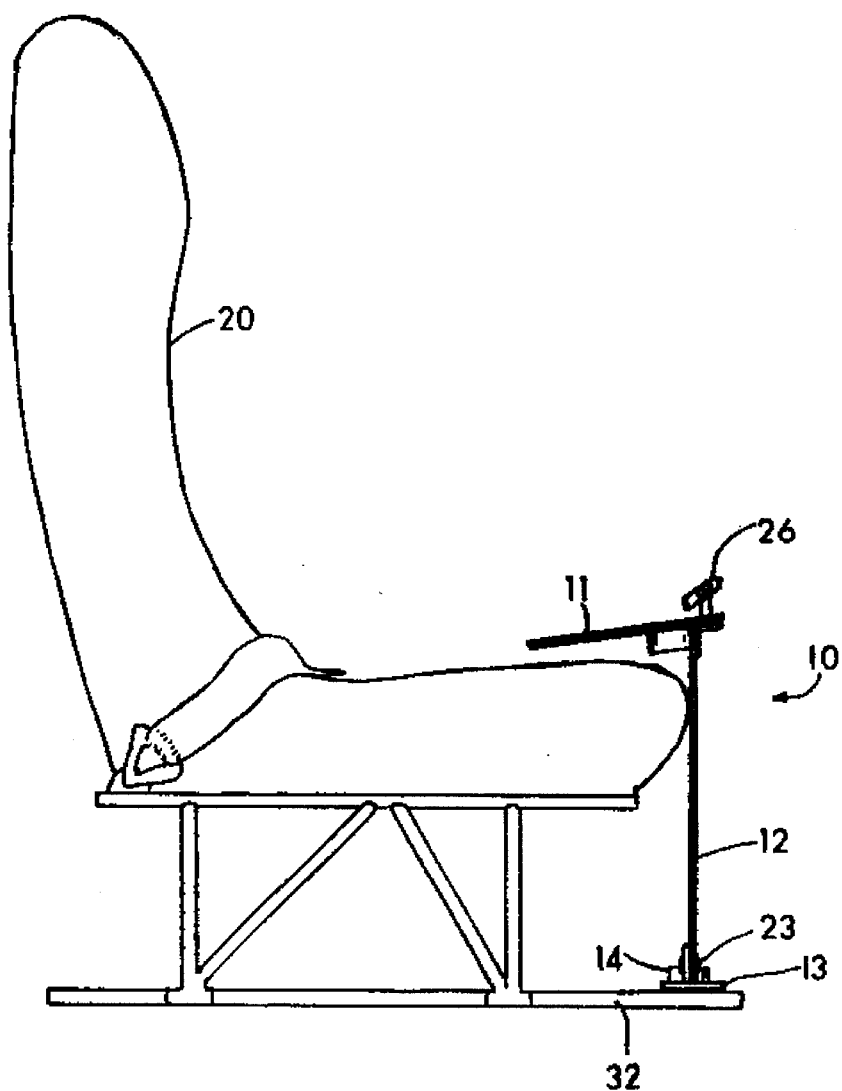
FIG. 3 is a side elevational view of the pilot's flight desk attached to a pilot's seat.

With reference to FIG. 3, it can be seen that the pilot's flight desk 10 is attached to the seat rails 32 of a pilot's seat 20 in the position which is convenient for use. Base plate 13 is placed on top of seat rails 32 and upright support leg 12 is pivotally moved to a stop so that the weight of writing surface 11 is offset as shown in FIG. 4 and thus upright support leg 12 is held in a raised position.

As can be seen by reference to FIG. 3, the attachment of writing surface 11 to upright support leg 12 by use of hinge 31 further provides a slight declining angle toward the aft of the aircraft so that writing surface 11 is at a comfortable angle for easy use. In FIG. 4, pilot 33 is utilizing the flight desk 10 and in FIG. 4 it can be seen that the pilot's flight desk 10 is completely out of the way of the flight controls as well as engine gauges of the aircraft and yet the pilot's flight desk 10 is in a convenient position for use.

Figure 4:
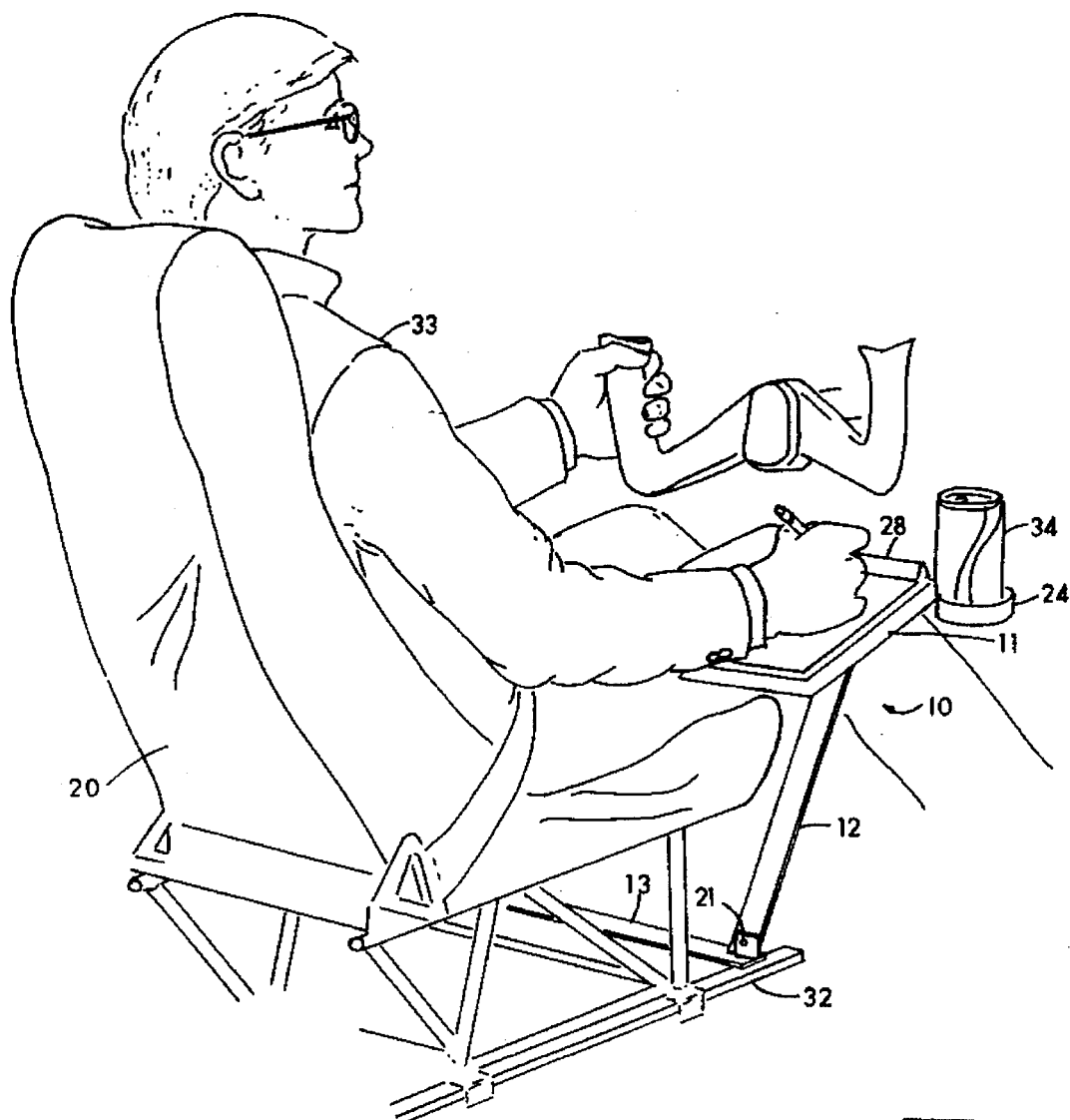
FIG. 4 is a perspective view of the pilot's flight desk of the instant invention in use forward and alongside of the pilot.

As can be seen by reference to FIG. 4, a can of soda 34 can be placed in cup holder 24 where it is convenient to grasp and yet is out of the way while writing or otherwise utilizing writing surface 11.

Figure 5:
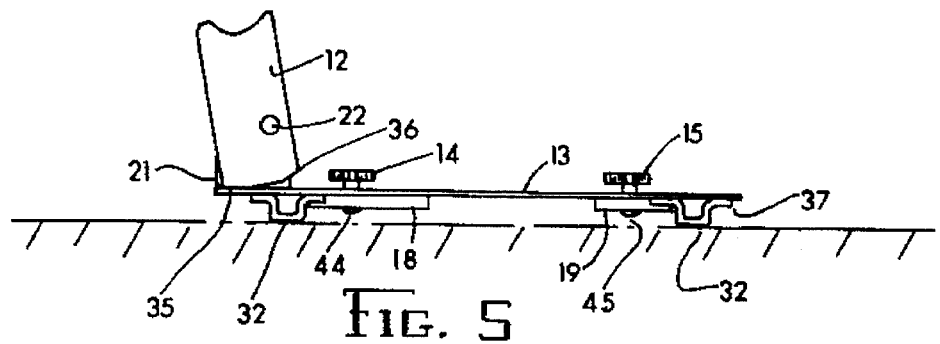
FIG. 5 is a partial front view of the pilot's flight desk in accordance with the present invention depicting the attachment of the desk baseplate to the seat rails of the aircraft.

With reference to FIG. 5, the connection of upright support leg 12 to transverse base plate 13 can be seen in that while support leg 12 is pivotally attached at screw connection 22, upright support leg 12 will only pivot with respect to support tab 21 in a clockwise or folding position. When support leg 12 is moved to a counterclockwise or unfolded position as shown in FIG. 5, upright support leg 12 lower end is provided with a flat stop surface 35 which rests against base plate 13 to stop the movement of upright support leg 12 in the counterclosewise direction thus providing an attachment of upright support leg 12 to base 13 in a fixed position. Support leg 12 will remain in the fixed, unfolded position until it is necessary to fold upright support leg 12 against transverse base plate 13. While in the raised or unfolded position as depicted in FIG. 5, the weight of the writing surface being offset from pivotal connection screw 22 keeps stop surface 35 resting against the upper surface of base plate 13 to provide a secure stop and a fixed position.

Still with reference to FIG. 5, it can be seen that seat rails 32 of the aircraft can be clamped against base plate 13 by use of clamp plates 18 and 19 which have been threadably inserted by clamp screw 14 and 15 respectfully. Clamp plates 18 and 19 are used in a conventional manner acting through slots 16 and 17 as shown in FIG. 1 to provide a clamping action against seat rails 32 between plate 13 and plates 18 and 19. Since different aircraft have different types of seat rails, it is necessary to provide a sufficient amount of clamping action to accomodate different rails, but it has been found that generally all general aviation aircraft are provided with two seat rails and that the seat rails 32 do provide a surface upon which clamp plates 18 and 19 can act to secure base plate 13 to the aircraft floor. Other means of securing base plate 13 can be provided to secure base plate 13 to the aircraft floor without departing of the teachings of this invention. Nevertheless, it has been found that the removable clamps as herein described provide the most secure and convenient method of attachment.

Figure 6:
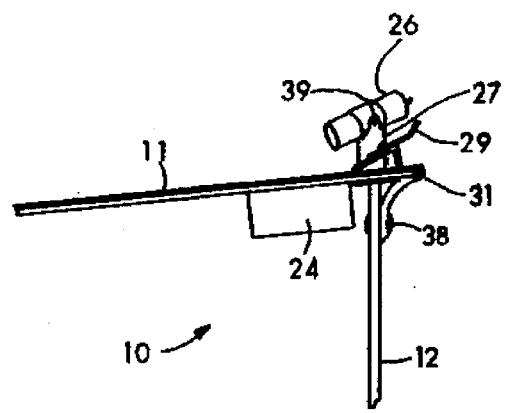
FIG. 6 is a partial side elevational view of the pilot's flight desk depicting in detail the attachment of the upright support to the planar writing surface in accordance with the present invention.

With reference to FIG. 6, it can be seen that hinge 31 provides a pivotal hinge point for writing surface 11 with respect to upright support leg 12. Pivotal connection 38 is also provided so that writing surface 11 can be swiveled as well as pivoted with respect to upright support leg 12 to provide a more compact folding position as shown in FIG. 2 and yet by having a positive contact between the lower surface of writing surface 11 and the upper edge of upright support leg 12, a fixed position of writing surface 11 can be maintained.

Figure 7:
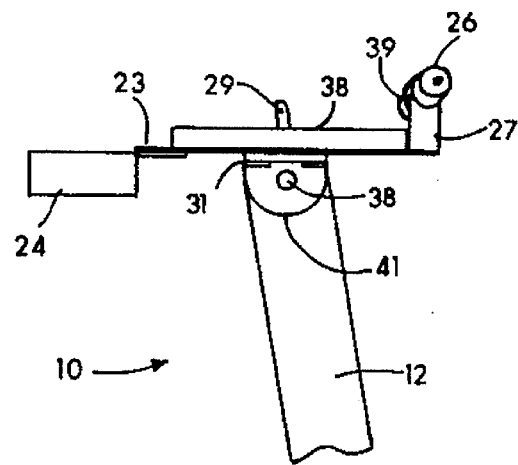
FIG. 7 is a partial rear elevational view of the pilot's flight desk depicting the swivel hinge connection between the board writing planar surface and the upright support all in accordance with the instant invention.

As shown in FIG. 7, since upright support 12 extends upwardly from the floor surface of the aircraft at an angle, it has been shown that any angle can be provided to place writing surface 11 in a comfortable, easily used position as shown in FIGS. 3 and 4.

With respect to FIGS. 6 and 7 it can further be seen that clip 28 is provided to secure papers, charts, and other articles. Pivoting cup holder 24 is also shown and is utilized in the manner previously discussed. Conventional battery operated nightlight 26 is attached to writing surface 11 in any recognized manner, however, the preferred form of attachment is to have a pivoting attachment 27 to writing surface 11 as well as to have a swiveling attachment 39 to pen light 26 so that the light 26 can be easily adjusted and aimed at the writing surface at the proper angle to flood the writing surface without distracting from the pilot's vision while operating at night.

Although specific applications, materials, components, connections, sequences of events, and methods have been stated in the above description of the preferred embodiment of the invention, other suitable materials, other applications, components and process steps as listed herein may be used with satisfactory results and varying degrees of quality. In addition, it will the understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A workstation assembly for vehicles, comprising:
   a pair of seat rails coupled to an operator's compartment of a vehicle;

a mounting bracket connecting a workstation to the seat rails of the vehicle, the mounting bracket allowing the workstation to be readily installed into and removed from the operator's compartment of the vehicle;

an upstanding support arm pivotally connected to the mounting bracket to allow the workstation to be pivoted about a first axis to pivotally move the workstation relative to a person seated within the operator's compartment, the mounting bracket allowing the upstanding support arm to be pivoted into a nesting relationship with respect to the mounting bracket;

a planar working surface coupled to the upstanding support arm;

a hinge interconnecting the support arm and the planar working surface, the hinge allowing the planar working surface to pivot about a second axis perpendicular to the first axis to allow the planar working surface to nest adjacent the upstanding support arm;

wherein pivoting of the upstanding support arm relative to the mounting bracket about the first axis and pivoting of the hinge about the second axis allow the upstanding support arm, the mounting bracket, and the planar working surface of the workstation to nest together to facilitate transportation of the workstation.

2. A workstation for vehicles according to claim 1 wherein the upstanding support arm includes a stop for terminating transverse pivoting of the upstanding support arm.

3. A workstation for vehicles according to claim 1 wherein the mounting bracket comprises an aircraft seat rail mounting bracket to mount the workstation directly to a seat rail inside an operator's compartment of an aircraft.

4. A workstation for vehicles according to claim 1, further comprising a cup holder pivotally coupled to the planar working surface, the cup holder pivoting between an extendable position for accepting a cup and a retracted position covered by the planar working surface.

5. A workstation for vehicles according to claim 1, further comprising a flashlight holder removably attached to the planar working surface.

6. A workstation for vehicles according to claim 1, further comprising:

a cup holder pivotally coupled to the planar working surface, the cup holder pivoting between an extendable position for accepting a cup and a retracted position covered by the planar working surface;

a flashlight holder removably attached to the planar working surface.

7. A workstation for vehicles, comprising:

a mounting bracket to connect an adjustable workstation to a vehicle, the mounting bracket allowing the workstation to be readily installed into and removed from an operator's compartment of the vehicle;

an upstanding support arm having a length connected to the mounting bracket;

a planar working surface coupled to the upstanding support arm;

a first pivot interconnecting the support arm and the planar working surface;

a second pivot being non-parallel to the first pivot, the second pivot interconnecting the support arm and the mounting bracket, the second pivot allowing the upstanding support arm to be articulated to a position adjacent the mounting bracket so that the length of the upstanding support arm runs along the side of the mounting bracket in a side-by-side parallel relationship;

the first and second pivots allow the upstanding support arm, the mounting bracket, and the planar working surface of the workstation to nest together in a parallel relationship to facilitate transportation of the workstation.

8. A workstation for vehicles according to claim 7 wherein the first pivot is perpendicular to the second pivot.

9. A workstation assembly for an aircraft, comprising:

a pair of seat rails coupled to an operator's compartment of an aircraft;

a mounting bracket connecting a workstation to the seat rails of the aircraft, the mounting bracket allowing the workstation to be readily installed into and removed from the operator's compartment of the aircraft;

an upstanding support arm pivotally connected to the mounting bracket to allow the workstation to be pivoted about a first axis to pivotally move the workstation relative to a person seated within the operator's compartment;

a planar working surface coupled to the upstanding support arm;

a hinge interconnecting the support arm and the planar working surface, the hinge allowing the planar working surface to pivot about a second axis perpendicular to the first axis to allow the planar working surface to nest adjacent the upstanding support arm.

* * * * *